United States Patent [19]

Ruhl et al.

[11] 4,405,273
[45] Sep. 20, 1983

[54] BLIND FASTENERS

[75] Inventors: John H. Ruhl, Tustin; Richard D. Dixon, San Pedro, both of Calif.

[73] Assignee: Huck Manufacturing Company, Irvine, Calif.

[21] Appl. No.: 204,838

[22] Filed: Nov. 7, 1980

Related U.S. Application Data

[63] Continuation of Ser. No. 967,781, Dec. 8, 1978, abandoned, which is a continuation-in-part of Ser. No. 817,096, Jul. 19, 1977, abandoned.

[51] Int. Cl.³ .............................................. F16B 13/08
[52] U.S. Cl. ........................................ 411/43; 411/56; 411/70
[58] Field of Search ........................... 411/56, 43, 70

[56] References Cited

U.S. PATENT DOCUMENTS

| | | | |
|---|---|---|---|
| 2,531,270 | 11/1950 | Hood | 411/43 |
| 2,546,602 | 3/1951 | Keating | 411/43 |
| 2,931,532 | 4/1960 | Gapp | 411/44 X |
| 3,148,578 | 9/1964 | Gapp | 411/34 |
| 3,286,580 | 11/1966 | Jeal | 411/34 |
| 3,653,294 | 4/1972 | Nason | 411/34 |
| 3,693,247 | 9/1972 | Brown | 411/339 |
| 3,702,088 | 11/1972 | Schmitt | 411/44 |
| 3,880,042 | 4/1975 | Binns | 411/43 |
| 4,046,053 | 9/1977 | Azvi et al. | 411/43 |
| 4,143,579 | 3/1979 | Ziaycek | 411/42 |

FOREIGN PATENT DOCUMENTS

| | | |
|---|---|---|
| 803184 | 1/1969 | Canada . |
| 2246833 | 3/1974 | Fed. Rep. of Germany . |
| 1128781 | 4/1971 | United Kingdom . |
| 596275 | 12/1974 | United Kingdom . |

*Primary Examiner*—Thomas J. Holko
*Attorney, Agent, or Firm*—Harness, Dickey & Pierce

[57] ABSTRACT

A blind fastener is disclosed which comprises a sleeve and pin of a selected metal in which the pin is designed to form a blind head over a wide range of grips which offers substantially uniform tensile values over the entire grip range. The blind head forming end of the pin includes a plurality of spaced annular or helical ribs formed between spaced annular or helical grooves which are designed to progressively distort or fold as the pin is pulled through the sleeve, at least one of the ribs remaining in an unfolded condition after the fastener is set. The pin shank and internal opening of the sleeve may be provided with complementary tapers to provide a sealing effect if desired.

14 Claims, 5 Drawing Figures

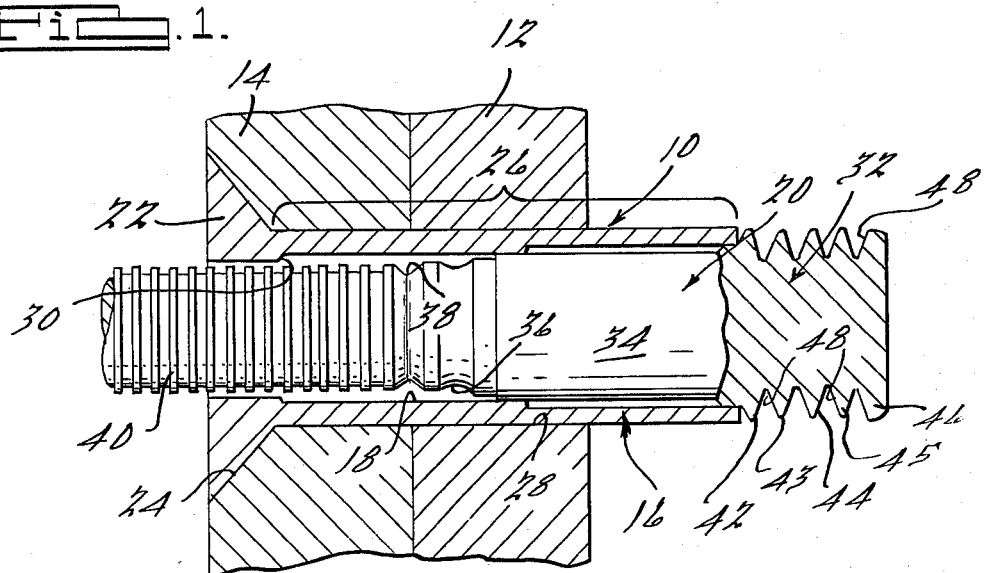
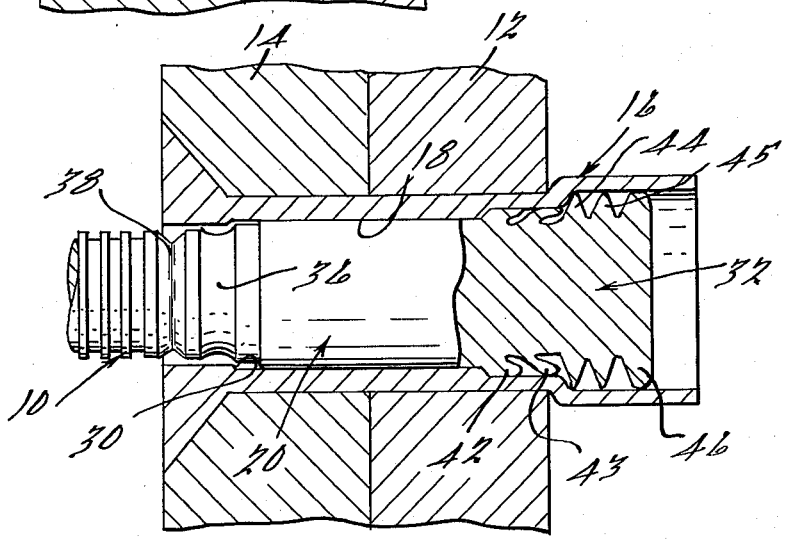

BLIND FASTENERS

RELATED APPLICATIONS

This application is a continuation of application Ser. No. 967,781, filed Dec. 8, 1978, now abandoned, which is a continuation-in-part of a copending application entitled "Blind Fasteners", Ser. No. 817,096, filed July 19, 1977 and assigned to the assignee of the present application now abandoned.

BACKGROUND OF THE INVENTION

One of the main difficulties in blind fasteners has been in providing a construction which would assure uniform preload values for a variety of grips or material thicknesses.

Illustrative of prior attempts are those disclosed in Schmitt, U.S. Pat. No. 3,702,088; Gapp, U.S. Pat. No. 3,148,578; Reynolds, U.S. Pat. No. 3,288,016; and Binns, U.S. Pat. No. 3,880,042.

SUMMARY OF THE INVENTION

According to the present invention, a blind rivet is provided which includes a tubular sleeve having a preformed head, of either a protruding or countersunk type, and a pin projecting therethrough. The pin has annular grooves serving as pull means provided at one end thereof, a breakneck, and a headed following end which is adapted to engage the inner end of the sleeve and when pulled through or into engagement with the inner end of the sleeve so as to form the blind head. The features so far described are generally the same as those disclosed in the prior Reynolds patent. However, according to this improvement and invention, the blind head is formed by progressive engagement of the inner end of the sleeve by spaced annular ribs formed on the following head end of the pin. In the preferred form the ribs are formed by spaced annular grooves. An alternate way would be the formation of such ribs as a spiral thread.

Depending upon the grip or material thickness with which the fastener is used, the ribs will progressively engage the end of the sleeve, form the blind head, and collapse or progressively fold back as they are pulled axially beyond the inner sheet line of the workpieces. At the end of the stroke, depending on the grip, pull pressure builds up to break the pin at the breakneck to complete setting of the fastener.

In the embodiment illustrated, the pin and sleeve may be locked together as disclosed in the prior Reynolds patent or in any other suitable manner.

Additional advantages and features of the present invention will become apparent from the subsequent description and the appended claims taken in conjunction with the accompanying drawings.

BRIEF DESCRIPTION OF THE DRAWINGS

FIG. 1 is a side elevational view of a fastener with parts sectioned and parts in elevation, embodying features of the present invention and in assembled relation with a pair of workpieces to be fastened together at nominal grip and with the fastener depicted prior to being set;

FIG. 2 is a view similar to FIG. 1 depicting the fastener at an early stage of its being set;

FIG. 3 is a view similar to FIG. 2 at a further state;

FIG. 6 is a view similar to that of FIG. 1 but illustrating another embodiment of the present invention;

FIG. 7 is a view similar to that of FIG. 4 but illustrating the embodiment of FIG. 6;

FIG. 8 is a fragmentary view of another embodiment of the present invention illustrating a portion of the fastener of the present invention in a set condition with a pin having a threaded blind head forming end; and FIG. 9 is a fragmentary view of another embodiment of the present invention illustrating a sleeve having a protruding head provided thereon.

DESCRIPTION OF THE PREFERRED EMBODIMENT AND BEST MODE OF OPERATION

Figure 4:
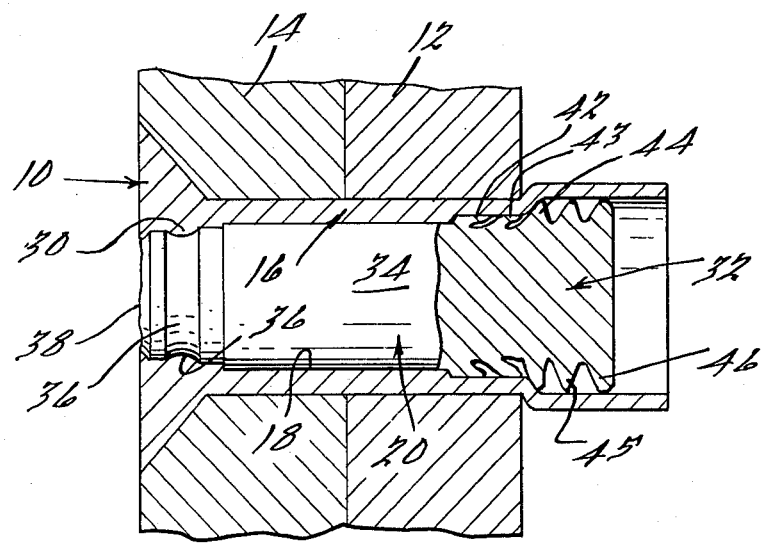
FIG. 4 is a view similar to FIGS. 2 and 3 at the final set stage, with the pintail broken off and with the pin and sleeve interlocked.

Referring to FIGS. 1 to 4, a fastener 10 is shown in assembled relationship with a pair of workpieces 12 and 14 to be joined together. The fastener 10 comprises a tubular sleeve 16 with a central bore 18 and a pin 20 extending therethrough.

The sleeve 16 has a frusto-conically shaped head 22 at its forward or outside end which mates with a countersunk bore 24 in the outer face of the workpiece 14. The sleeve 16 has a cylindrical body portion 26 which extends rearwardly through and substantially beyond opening 28 in rear or inner workpiece 12.

The bore 18 terminates adjacent the head 22 in an annular shoulder 30 which provides material for interlocking the pin 20 and the sleeve 16 and also provides a positive stop for limiting the movement of the pin 20 relative to the sleeve 16 as disclosed in the aforementioned Reynolds patent.

The pin 20, as assembled to the sleeve, has a head end generally indicated at 32, a shank portion 34, a lock groove 36, a breakneck groove 38, and a pull portion 40 formed of annular pull grooves in the usual way.

The present invention lies in the construction of the head end 32 of the pin 20, its arrangement with respect to the inner end of the sleeve and its function in forming the blind head for the accommodation of different grips.

The head end portion 32 comprises a plurality of annular ribs 42, 43, 44, and 45 and terminating in an end rib 46. Such ribs are formed by spaced annular grooves 48, the root diameters of which are less than the diameter of the shank portion 34. The ribs are also preferably shaped to have a pyramidal cross-sectional configuration tapering inwardly to have a base portion of greatest strength. This permits the controlled and progressive bending or folding of the ribs as the fastener is set.

By controlling the depth or root diameters of the grooves 48 and/or the transverse width or configurations of the grooves, the cross-sectional configuration of the ribs may be likewise varied to vary the resistance to deflection or bending of such ribs. Thus, sleeve expansion or head formation may be varied for a desired design as well as load resistance at any portion of the installation cycle.

The rib 42 is stronger than ribs 43, 44, and 45 because the diameter of shank 34 is greater than the root diameter of adjacent groove 48. In the embodiment illustrated, ribs 43, 44, and 45 have uniform resistance to bending. But, variation in such bending resistance could be accomplished by varying the root diameters of grooves 48. The end rib 46 preferably has the greatest width dimension so that it is the strongest and not bendable at the end of the setting stroke.

As pin 20 is moved longitudinally through sleeve 16, rib 42 will be drawn into bore 18 thereby causing a head to be formed by the radially outward expansion of sleeve 16. As a continued pulling force is applied to pin 20, and rib 42 approaches the rear or inner sheet line of workpiece 12, radial expansion of sleeve 16 will be resisted by the rear workpiece sheet line or opening 28 whereby the rib 42 will be deflected or folded back into immediately adjacent groove 48.

Referring to FIG. 2, the blind head has been formed and the first rib 42 collapsed or folded back. It should be noted that as shown in FIG. 2, ribs 42, 43, 44, and 45 are preferably positioned such that when rib 42 has been completely folded back, the next adjacent rib 43 will have moved into close proximity to the sheet line so as to reinforce the retention strength of the annular shoulder formed by the radial outward expansion of sleeve 16. In FIG. 3, at a further step in the setting cycle, the pin 10 has moved further into the sleeve and ribs 42 and 43 collapsed or folded back. Rib 44 has now moved into a position immediately adjacent the sheet line so as to replace preceding folded rib 43. In FIG. 4, the pin 10 has been moved to its complete set position, the interlock 30 has occurred, and the pin broken at the breakneck 38. For this grip, ribs 42 and 43 have folded back and rib 44 is beginning to fold back. However, as shown therein, rib 44 is still operative to resist radially inward deformation of the head formed at the rearward end of sleeve 16 and therefore is effective in contributing to the tensile strength to the fastened joint.

Figure 5:
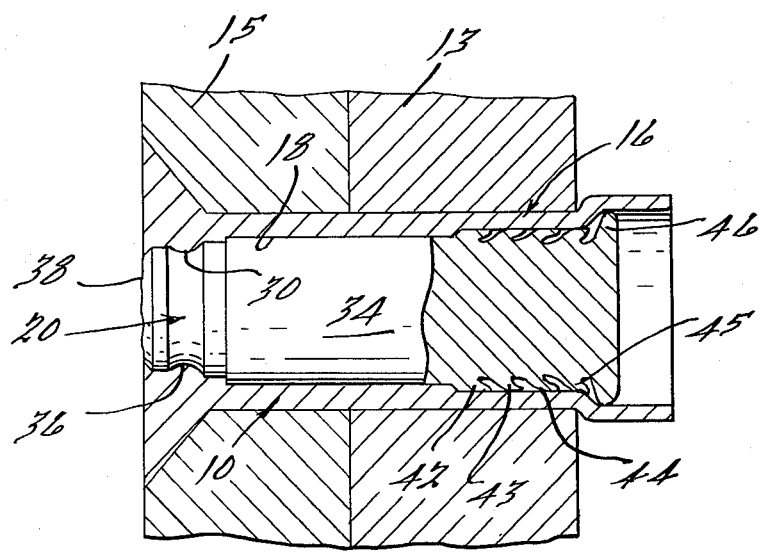
FIG. 5 is a view similar to FIG. 4 with the fastener finally set in workpieces of maximum thickness or maximum grip.

Referring to FIG. 5, workpieces 13 and 15, corresponding to members 12 and 14, are thicker and may be considered as illustrative of maximum grip. Thus, when finally set, ribs 42, 43, 44, and 45 have all collapsed backwardly. In this embodiment, rib 46 is now located in close proximity to the rear sheet line of workpiece 13 and is effective in contributing to the tensile strength of the fastened joint.

Referring now to FIGS. 6 and 7, there is shown another embodiment of the blind fastener in accordance with the present invention indicated generally at 56 installed within openings 57 and 59 of workpieces 61 and 63. Fastener 56 is similar to fastener 10 comprising a tubular sleeve 58 having a central bore 60 with a pin 62 extending therethrough. However, in this embodiment, bore 60 has a diameter which increases slightly as it extends from the outer end 64 to inner end 66 of sleeve 58. Bore 60 is also provided with an inner annular shoulder 68 and an outer annular shoulder 70 similar to those provided within bore 18 of sleeve 16 described above.

Pin 62 is also of similar construction to that of pin 20 described above having a pull portion 72 provided at the outer end thereof, a breakneck groove 74, a locking groove 76, a shank portion 78, and a head forming end 80 provided with a plurality of annular ribs 82, 84, 86, 88, 90 spaced by grooves 92. However, shank portion 78 is of a tapered construction and hence has a diameter increasing from a part beginning adjacent locking groove 76 and extending to approximately just short of rib 82. Both shank portion 78 and bore 60 are provided with complementary tapers, typically on the order of one-quarter inch per foot, which cooperate to provide a preselected interference fit between pin 62 and sleeve 58 sufficient to create a fluid tight seal therebetween. Further, the radial outwardly directed force generated by this interference fit will also operate to fill holes 57 and 59 and thereby aid in establishing a fluid tight seal between the outer surface of tubular sleeve 58 and workpieces 61 and 63. Thus, fastener 56 is particularly well suited for use in construction of fluid holding tanks such as aircraft fuel tanks or the like as well as other structures requiring a self-sealing fluid tight fastener. Ribs 82 through 90 will function in substantially identical manner as ribs 42 through 46 of fastener 10 so as to provide a single fastener capable of providing a relatively uniformly high tensile strength fastened joint over a broad range of grips.

While both fasteners 10 and 58 have been illustrated as incorporating annular ribs, helical ribs may be substituted therefor. A portion of a fastener 95 is illustrated in FIG. 8 in which pin 96 is provided with a plurality of helically extending ribs (or threads) 98, 100, 102, 104, and 106 separated by grooves 108 disposed therebetween. Tubular sleeve 16' is substantially identical to tubular sleeve 16.

As seen therein, the initial portion of outermost rib 98 will be stronger than ribs 100, 102, 104, and 106 due to the relative greater diameter of shank portion 110 as compared to groove 108. Thus, rib 98 will operate to radially expand tubular sleeve 16' creating a head having an annular shoulder 112 at sheet line 114 after which it will progressively be folded back into adjacent groove 108. Since the ribs 98–106 are helical, only a relatively small portion thereof will be undergoing the folding process at any point in time thus reducing the required installation force. Further, when fastener 95 is fully set at least a portion of a selected one of the helical ribs will be at the sheet line 114 so as to provide reinforcement for annular shoulder 112.

It should be noted that while each of the above embodiments have been described and illustrated in conjunction with a sleeve having a countersink or flush type head provided thereon, the present invention is equally applicable to a blind fastener having a tubular sleeve 116 provided with a protruding head 118 as shown in FIG. 9.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A blind fastener of a selected metal for joining together a plurality of workpieces over a wide range of grips comprising a hollow tubular sleeve having a preformed head at one end and an open tubular extension at the other end, a pin including a shank disposed within said tubular sleeve having pull means formed thereon extending beyond the preformed head on the sleeve and having a solid blind head forming portion, extending beyond said other end of said sleeve, said blind head forming portion comprising a plurality of spaced annular ribs forming grooves therebetween constructed to engage and expand said other end of said sleeve to form the blind head and to fold back successively in engagement with the inner wall of said other end as the fastener is set for different grips, said grooves having a root diameter less than the diameter of said pin shank and the last following rib of the head forming portion is of the greatest strength and the first leading rib is of a strength more resistant to deflection than the remaining ribs intermediate said last following rib and said first leading rib.

2. A blind fastener according to claim 1 in which the remaining intermediate ribs are of uniform resistance to deflection.

3. A blind fastener for joining together a plurality of workpieces over a wide range of grips comprising a hollow tubular sleeve extending a preformed head at one end and an open tubular extension at the other end, a pin including a shank disposed within said tubular sleeve having pull means formed thereon extending beyond the preformed head on the sleeve and having a blind head forming portion extending beyond said other end of said sleeve, said blind head forming portion comprising a plurality of spaced circumferentially extending helical ribs forming grooves therebetween constructed to engage and expand said other end of said sleeve to form the blind head, selected ones of said ribs being adapted to fold back successively as they are moved through a plane defined by the rearward surface of said workpieces, at least one of said plurality of ribs remaining in an unfolded condition proximate to said rearward surface after setting of said fastener and when said fastener is applied to workpieces of different grips within said grip range.

4. A blind fastener according to claim 3 in which the number of ribs that collapse varies in accordance with variations in grip in which the fastener is employed.

5. A blind fastener according to claim 4 in which the number of ribs that collapse increases with increase in grip in which the fastener is employed.

6. A blind fastener according to claim 3 in which the grooves that form the ribs are of a smaller root diameter than the diameter of the pin shank proximate to the first of said ribs.

7. A blind fastener as set forth in claim 3 in which said at least one of said plurality of ribs is positioned closely adjacent said rearward surface when said fastener is set so as to assist in retaining said other end of said sleeve in an expanded condition, said at least one of said plurality of ribs is operative to contribute to the tensile strength of said fastener.

8. A blind fastener as set forth in claim 3 wherein said hollow sleeve has a sleeve tapered surface defined by an internal diameter which increases toward said other end and said shank has a shank tapered surface defined by a diameter which increases toward said head forming portion, said shank tapered surface and said sleeve tapered surface engaging in a fluid tight sealing relationship when said fastener is set.

9. A blind fastener as set forth in claim 3 wherein said preformed head has a generally frusto-conical shape.

10. A blind fastener as set forth in claim 3 wherein a last one of said ribs is of a strength selected to resist deflection and thereby inhibit setting of said fastener when it is applied to a grip larger than the maximum grip of said grip range.

11. A blind fastener as set forth in claim 3 wherein the first of said ribs has a preselected strength sufficient to resist deflection while expanding that portion of said tubular extension extending beyond said rearward surface.

12. A blind fastener for joining together a plurality of workpieces over a wide range of grips comprising a hollow tubular sleeve having a preformed head at one end and an open tubular extension at the other end, a pin including a shank disposed within said tubular sleeve having pull means formed thereon extending beyond the preformed head on the sleeve and having a blind head forming portion extending beyond said other end of said sleeve, said blind head forming portion comprising a plurality of spaced helical ribs forming grooves therebetween constructed to engage and expand said other end of said sleeve, said plurality of ribs extending over a predetermined axial length of said pin, said predetermined length establishing a grip range for said fastener, selected ones of said ribs being adapted to fold back successively as they are moved through an area of engagement between said expanded sleeve and said workpieces, at least one of said plurality of ribs remaining in an unfolded condition after setting of said fastener and being positioned closely adjacent said area of engagement whereby said at least one of said plurality of ribs is operative to contribute to the tensile strength of said fastener as set when said fastener is applied to workpieces of different grips within said grip range.

13. A blind fastener as set forth in claim 12 wherein said hollow sleeve has a sleeve tapered surface defined by an internal diameter which increases toward said other end and said shank has a shank tapered surface defined by a diameter which increases toward said head forming portion, said shank tapered surface and said sleeve tapered surface engaging in a fluid tight sealing relationship when said fastener is set.

14. A blind fastener as set forth in claim 12 wherein the first of said ribs has a preselected strength sufficient to resist deflection while expanding that portion of said tubular extension extending beyond said rearward surface.

* * * * *

UNITED STATES PATENT AND TRADEMARK OFFICE
CERTIFICATE OF CORRECTION

PATENT NO. : Pat. #4,405,273

DATED : Issued September 20, 1983

INVENTOR(S) : Inventor John H. Ruhl et al

It is certified that error appears in the above-identified patent and that said Letters Patent is hereby corrected as shown below:

Column 5, line 9, "extending" should be --having--.

Signed and Sealed this

Twenty-second Day of November 1983

[SEAL]

Attest:

GERALD J. MOSSINGHOFF

Attesting Officer   Commissioner of Patents and Trademarks